Apr. 17, 1923.
D. MACKENZIE
1,451,994
DEVICE FOR PREVENTING FROST IN ORCHARDS
Filed July 7, 1921
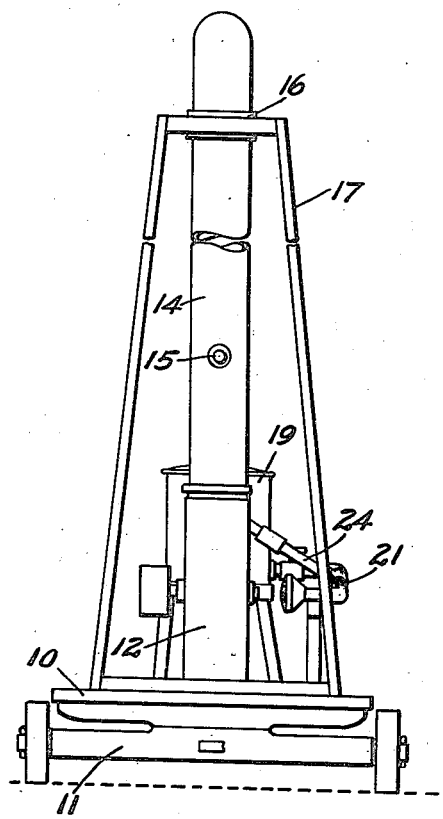
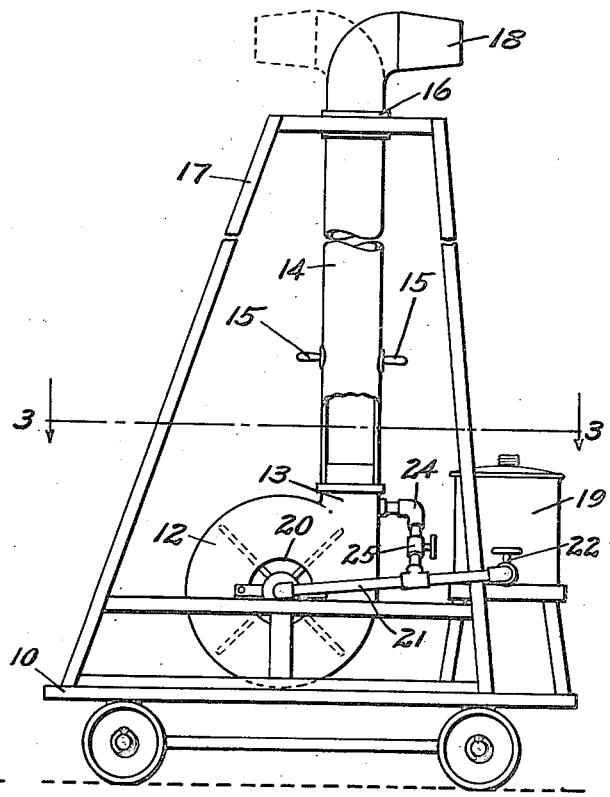
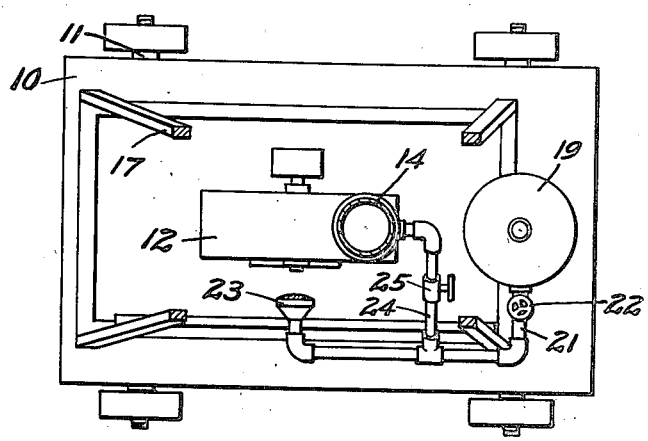
INVENTOR
DANIEL MACKENZIE
BY
ATTORNEYS.

Patented Apr. 17, 1923.

1,451,994

UNITED STATES PATENT OFFICE.

DANIEL MACKENZIE, OF POMONA, CALIFORNIA

DEVICE FOR PREVENTING FROST IN ORCHARDS.

Application filed July 7, 1921. Serial No. 482,972.

*To all whom it may concern:*

Be it known that I, DANIEL MACKENZIE, a citizen of the United States, residing at Pomona, in the county of Los Angeles and State of California, have invented new and useful Improvements in Devices for Preventing Frost in Orchards, of which the following is a specification.

My invention relates to an apparatus for preventing frosts in orchards, the principal object of my invention being to provide relatively simple and efficient means for agitating and setting up air currents around and above the trees of an orchard, and particularly citrus fruit bearing trees for the purpose of moderating the temperature immediately adjacent to said trees and consequently preventing the formation of frost.

Further objects of my invention are to provide a relatively simple and practical portable apparatus that may be readily moved from one position to another, and which may be utilized for directing currents of heated air between and above the trees of a citrus orchard, to provide an apparatus wherein the nozzle or outlet may be readily shifted into any angle throughout a horizontal plane, and further to provide an apparatus that will be very effective in performing its intended functions.

With the foregoing and other objects in view, my invention consists in certain novel features of construction and arrangement of parts that will be hereinafter more fully described and claimed and illustrated in the accompanying drawing, in which:

Figure 1 is an end view of an apparatus of my improved construction.

Fig. 2 is a side elevational view thereof with parts broken away in section.

Fig. 3 is a horizontal section taken approximately on the line 3—3 of Fig. 2.

Referring by numerals to the accompanying drawing which illustrates a practical embodiment of my invention, 10 designates a suitable platform that is suitably supported on wheel carrying axles 11 in order that the apparatus may be readily moved from one position to another, and mounted on said platform is a suitable fan or blower 12 that may be driven in any suitable manner, preferably by means of a small gas engine or electric motor.

Supported by the tubular outlet 13 from the blower housing is the lower end of a pipe 14 preferably formed of sheet metal, and said pipe being mounted so that it will rotate freely on the member 13, and in order that said pipe may be manually engaged and rotated, suitable handles 15 project outwardly from said pipe a short distance above its lower end.

The upper portion of the rotatably arranged pipe 14 operates in a suitable bearing 16 that is carried by the upper end of a framework 17, the latter being supported on platform 10, and the upper end of said pipe 14 terminates at a suitable point above said bearing 16 in a horizontally disposed nozzle 18. Suitably supported on platform 10 is a tank or container 19 for liquid hydrocarbon, and leading therefrom to a point directly in front of the intake opening 20 of the blower housing 12 is a liquid hydrocarbon supply pipe 21 in which is located a suitable control valve 22. The end of the pipe 21 in front of the opening 20 is provided with a suitable burner 23, and leading from the interior to the blower housing to pipe 21 is an air supply pipe 24 in which is located a control valve 25.

During the operation of my improved apparatus valves 22 and 25 are opened, thereby permitting liquid hydrocarbon and air to pass through tubes 21 and 24, and the air mixing with the liquid hydrocarbon forms a combustible vapor that ignites as it issues from burner 23, and as the blower is operated at suitable speed, air, heated by the flames issuing from burner 23, will be drawn into the blower housing through opening 20 and will be forced from said housing upwardly through pipe 14 and be discharged in a substantially horizontal direction through nozzle 18. Thus a current of heated air will be directed between or over the trees of the orchard, and by utilizing a number of the devices the air adjacent to the trees of the orchard may be sufficiently agitated to prevent frost from forming or settling on the trees.

In southern California, and particularly those sections that are largely devoted to the production of citrus fruits, the temperature rarely goes below 25° or 27° F., and as the trees and fruit, by reason of their natural heat, can withstand for several hours temperatures three or four degrees below the freezing point, it is necessary under extreme conditions only to provide for the control of the temperature throughout a range of 4° or 5° to prevent damage by frost. In practice I have, with an apparatus constructed substantially as herein shown and described and operated in an orchard, raised the temperature 5° and maintained such temperature for a considerable period of time. Such raise in temperature together with the agitation of the air will effectually prevent the formation and settling of frost in the vicinity of the apparatus.

It will be understood that minor changes in the size, form and construction of the various parts of my improved apparatus for preventing frosts in orchards may be made and substituted for those herein shown and described without departing from the spirit of my invention, the scope of which is set forth in the appended claims.

I claim as my invention:

1. A device for preventing frosts in orchards comprising a fan blower including a casing having a peripheral outlet and an opening in one side thereof at the axis of the casing, a burner arranged exteriorly of the casing and adjacent said opening, a distributing pipe connected to the outlet, a fuel supply tank in communication with the burner, and an air supply pipe communicating with the casing adjacent the outlet and connected between the burner and said tank.

2. A device for preventing frosts in orchards comprising a fan blower including a casing having a peripheral outlet and an opening in one side thereof at the axis of the casing, a burner disposed exteriorly of the casing adjacent said opening, a distributing pipe rotatably sustained on the casing at the outlet, handles for manually rotating the distributing pipe, a discharge nozzle on the upper end of the distributing pipe having its discharge end disposed in a horizontal plane, a fuel supply tank for the burner, and an air pipe communicating with the casing adjacent the outlet, and connected to said burner.

3. A device for preventing frosts in orchards comprising a portable platform, a frame on the platform, a fan blower on the platform and including a casing having a peripheral outlet and an opening at one side thereof at its axis, a fuel supply tank sustained on the platform, a burner disposed exteriorly of the casing and adjacent said opening, a pipe for effecting communication between the fuel supply tank and said burner, an air pipe communicating with the casing adjacent the outlet and connected to said pipe between the burner and tank, a distributing pipe journaled in the frame and having its lower end rotatably associated with the outlet, handles on the pipe for rotating the latter, and a discharge nozzle disposed above the frame and in a horizontal plane.

4. A device for preventing frosts in orchards comprising a fan blower including a casing having a peripheral outlet and an opening in one side thereof, heating means disposed adjacent said opening whereby heated air is drawn into the casing upon rotation of the blower and discharged through said outlet, and an air pipe communicating with the casing adjacent the outlet and conducting a portion of the heated air from the blower to said heating means.

5. A device for preventing frosts in orchards comprising a fan blower including a casing having an outlet and an opening therein, a burner arranged exteriorly of the casing adjacent said opening, a distributing pipe connected to the outlet, a fuel supply tank in communication with the burner, and an air supply pipe communicating with the casing adjacent the outlet and connected with the burner and said tank.

In testimony whereof I have signed my name to this specification.

DANIEL MACKENZIE.